United States Patent [19]

Yamaguchi et al.

[11] Patent Number: 4,770,266

[45] Date of Patent: Sep. 13, 1988

[54] BRAKE CONTROL SYSTEM FOR FOUR-WHEEL DRIVE VEHICLE

[75] Inventors: Hisaaki Yamaguchi; Yoshihito Sata; Hisashi Terashima; Akira Marumoto; Hiroyuki Takahashi, all of Hiroshima, Japan

[73] Assignee: Mazda Motor Corporation, Hiroshima, Japan

[21] Appl. No.: 895,443

[22] Filed: Aug. 11, 1986

[30] Foreign Application Priority Data

| Aug. 13, 1985 | [JP] | Japan | 60-178156 |
| Aug. 22, 1985 | [JP] | Japan | 60-184578 |
| Aug. 22, 1985 | [JP] | Japan | 60-184579 |
| Aug. 22, 1985 | [JP] | Japan | 60-184582 |

[51] Int. Cl.$^4$ .................. B60K 23/08; B60T 8/32
[52] U.S. Cl. ........................ 180/197; 180/233; 180/244; 180/248; 180/249; 303/110; 364/426.02
[58] Field of Search ............ 180/233, 244, 245, 247, 180/248, 249, 197; 303/110; 364/424, 424.1, 426

[56] References Cited

U.S. PATENT DOCUMENTS

| 4,230,376 | 10/1980 | Brearley et al. | 303/110 X |
| 4,538,700 | 9/1985 | Suzuki | 180/248 |
| 4,602,696 | 7/1986 | Taga et al. | 180/233 X |
| 4,671,373 | 6/1987 | Sigl | 180/197 |
| 4,700,797 | 10/1987 | Lieber | 180/197 |
| 4,702,337 | 10/1987 | Burckhardt et al. | 180/197 |

FOREIGN PATENT DOCUMENTS

| 206476 | 12/1986 | European Pat. Off. | 180/233 |
| 3015379 | 10/1981 | Fed. Rep. of Germany | 180/244 |
| 84227 | 5/1982 | Japan | 180/244 |
| 22530 | 2/1985 | Japan | 180/233 |
| 64035 | 4/1985 | Japan | 180/233 |
| 2139972 | 11/1984 | United Kingdom . | |

Primary Examiner—John J. Love
Assistant Examiner—Mitchell J. Hill
Attorney, Agent, or Firm—Gerald J. Ferguson, Jr.

[57] ABSTRACT

A brake control system for a vehicle provided with a four-wheel drive mechanism and an antiskid brake system for controlling the braking effort upon application of the brakes to prevent locking of the wheels comprises a brake application sensor for detecting application of the brakes over a predetermined level to such a degree that can lead to locking of the wheels, and a releasing mechanism which releases the driving connection between the front wheel driving system and the rear wheel driving system of the four-wheel drive mechanism when the brake application sensor detects application of the brakes over the predetermined level.

12 Claims, 18 Drawing Sheets

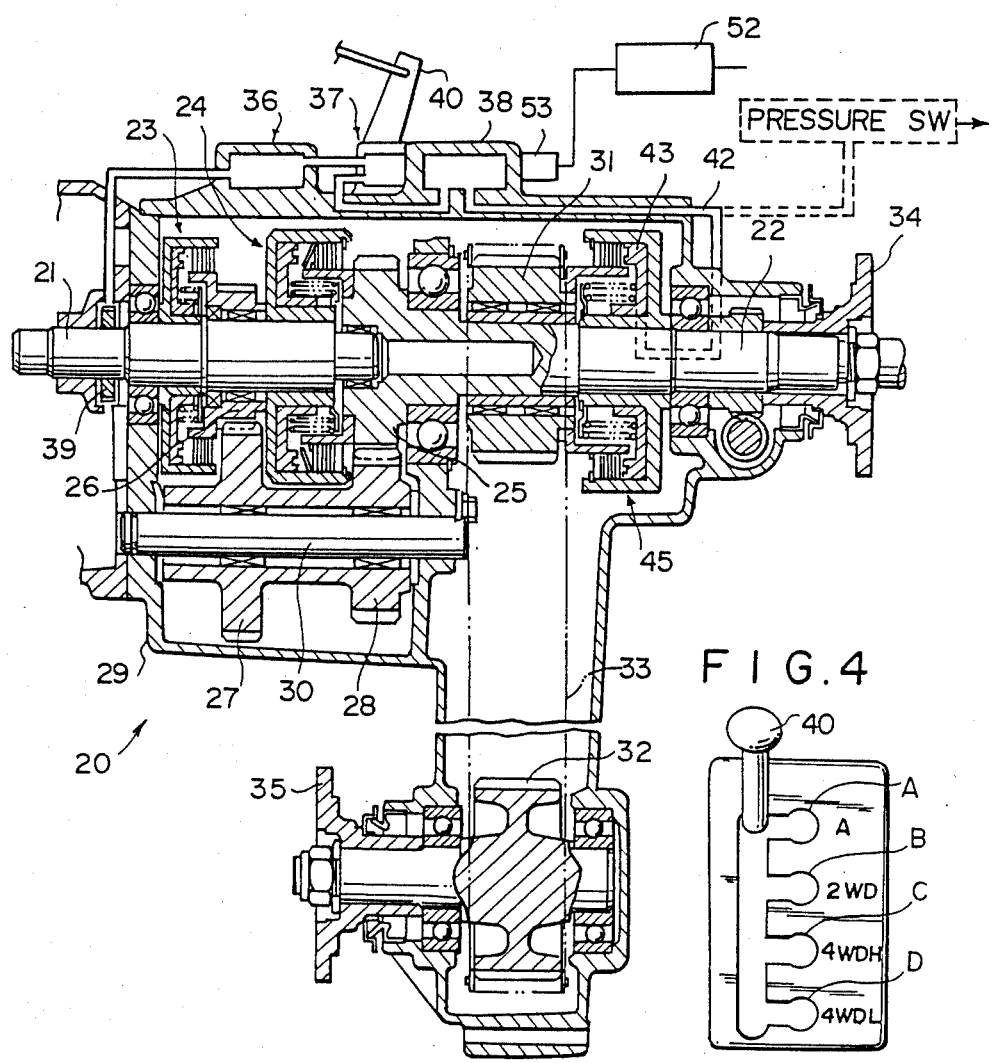

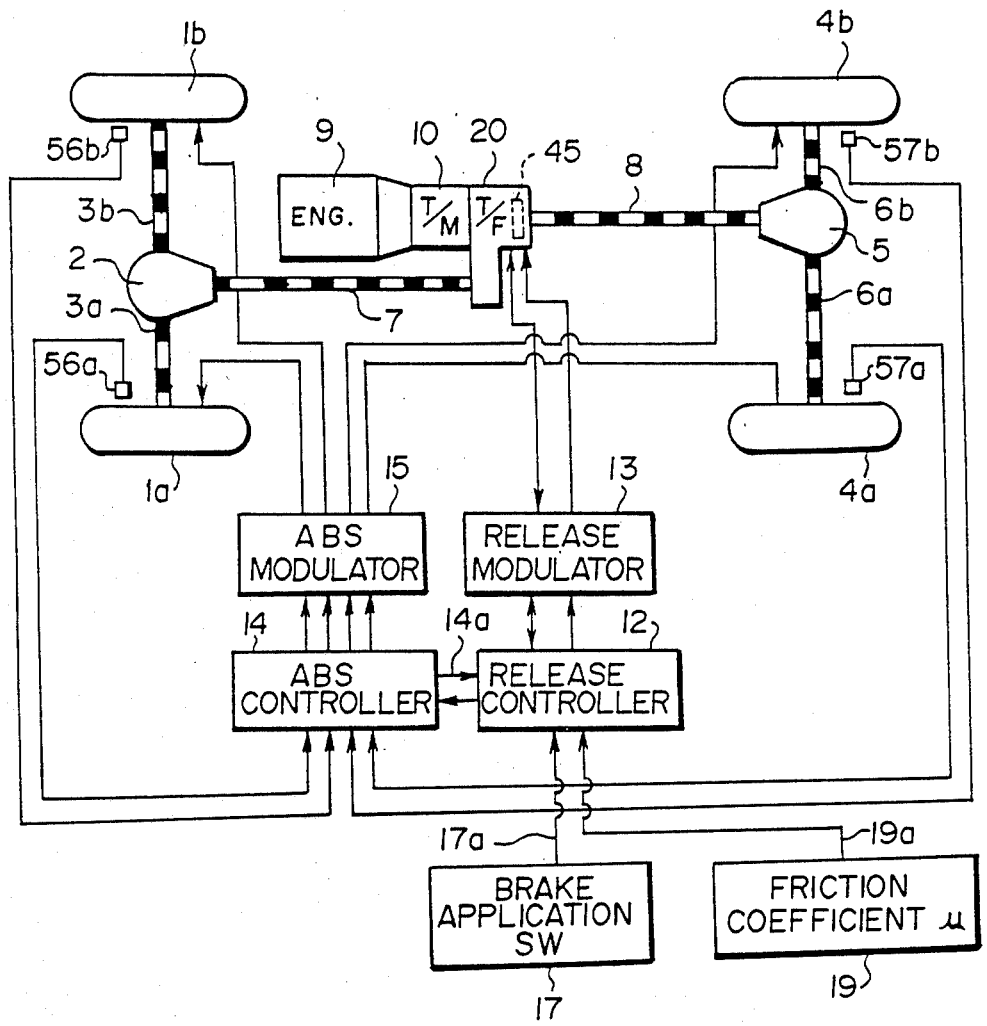
F I G.14

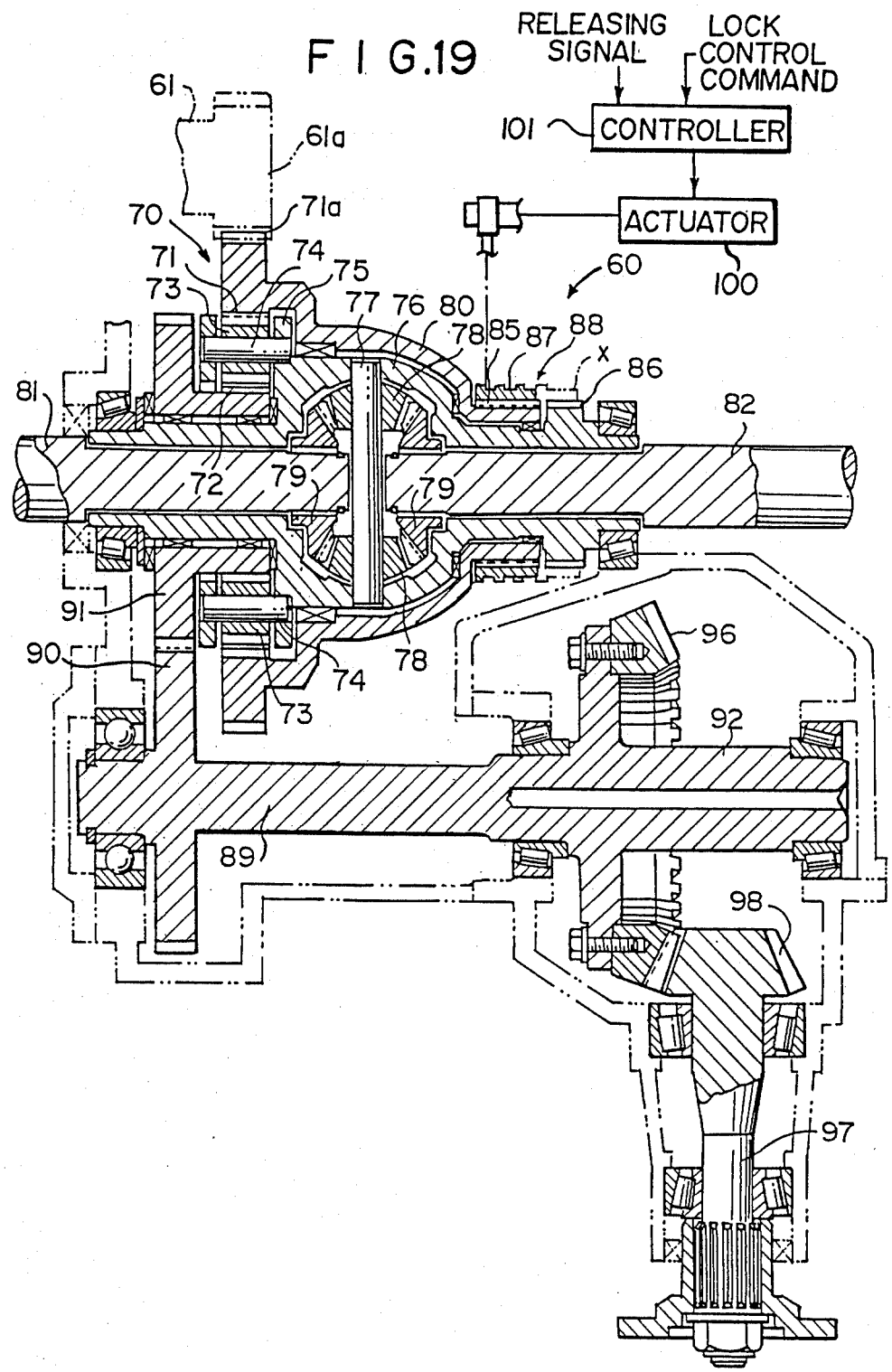

BRAKE CONTROL SYSTEM FOR FOUR-WHEEL DRIVE VEHICLE

BACKGROUND OF THE INVENTION

1. Field of the Invention

This invention relates to a brake control system for a four-wheel drive vehicle having a four-wheel drive mechanism and an antiskid brake system.

2. Description of the Prior Art

There has been known an antiskid brake system in which the hydraulic pressure to the brakes is controlled to limit the factor of skid of the wheels to thereby ensure the most efficient braking when the brakes are applied during running. Generally, the most efficient braking is obtained when the factor of skid of the wheels is near 20%. Such an antiskid brake system has been put into practice for two-wheel drive vehicles. For example, in Japanese Unexamined Patent Publication No. 57(1982)-7747, there is disclosed an antiskid brake system for a two-wheel drive vehicle in which the hydraulic pressure to the brakes is controlled according to the deceleration of the wheel speed to prevent the wheels from being locked. However, the antiskid brake system has not been put into practice for four-wheel drive vehicles.

This may be because of the following reason. In the antiskid brake system, the factor of skid of the wheels is obtained through the actual vehicle speed determined by detecting the rotational speeds of the four wheels and by comparing the rotational speed of skidding wheels with the rotational speed of the wheels which are not skidding. In the case of the four-wheel drive vehicles, the four wheels are mechanically drivingly connected with each other and the four wheels begin to skid simultaneously. This makes difficult determination of the actual vehicle speed. Though it may be theoretically possible to determine the actual vehicle speed by use of sound locator or the like, this approach is not practical at present in view of the manufacturing cost and the like.

The conventional antiskid brake system may be applied to the four-wheel drive vehicle by changing four-wheel drive to two-wheel drive when the brakes are applied. (Though not intended to be associated with the antiskid brake system, a four-wheel drive vehicle in which the front wheels and the rear wheels are disconnected from each other when the brakes are applied is disclosed in UK Patent Application GB 2 139 972A.) In this case, application of the brakes can be detected by use of a switch to be actuated in response to operation of the brake pedal, a switch to be actuated according to the brake fluid pressure or the like. However, if the drive is changed from four-wheel drive to two-wheel drive every time the brake pedal is pushed down, change of the drive between four-wheel drive and two-wheel drive is effected even when the brake pedal is lightly pushed down and is frequently effected when the brake pedal is repeatedly pushed down, thereby adversely affecting the running performance of the vehicle.

SUMMARY OF THE INVENTION

In accordance with the present invention, there is provided a brake control system for a vehicle provided with a four-wheel drive mechanism having a front wheel driving system and a rear wheel driving system adapted to be drivingly engaged with each other and an antiskid brake system for controlling the braking effort upon application of the brakes to prevent locking of the wheels comprising a brake application detecting means for detecting application of the brakes over a predetermined level to such a degree that can lead to locking of the wheels, and a releasing means which releases the driving connection between the front wheel driving system and the rear wheel driving system of the four-wheel drive mechanism when the brake application detecting means detects application of the brakes over the predetermined level.

In one embodiment of the present invention, the brake application detecting means determines that the brakes are applied over the predetermined level when the brakes are continuously applied for a time longer than a predetermined time.

In another embodiment of the present invention, the brake application detecting means determines that the brakes are applied over the predetermined level when the deceleration of the wheel speed exceeds a predetermined value.

In still another embodiment of the present invention, the brake application detecting means determines that the brakes are applied over the predetermined level when the difference between the deceleration of the wheel speed and the deceleration of the vehicle speed exceeds a predetermined value.

There have been known two types of four-wheel drive vehicles, one a so-called part-time four-wheel drive type having no center-differential in which the drive is manually changed between the four-wheel drive and the two-wheel drive according to the driver's choice, and the other a so-called full-time four-wheel drive type having a center differential. The front wheel driving system and the rear wheel driving system are said to be drivingly engaged with each other when the drive is set to the four-wheel drive in the part-time four-wheel drive vehicle and when the center differential is locked in the full-time four-wheel drive vehicle.

The "driving connection" between the front wheel driving system and the rear wheel driving system can be released by changing drive to the four-wheel drive in the case of the part-time four-wheel drive vehicle, and by releasing the center differential in the case of the full-time four-wheel drive vehicle. In the case of the four-wheel drive vehicle disclosed in said UK Patent Application in which a viscous coupling is used, the driving connection between the front wheel driving system and the rear wheel driving system is released by disengaging a clutch provided in series with the viscous coupling.

BRIEF DESCRIPTION OF THE DRAWINGS

FIG. 3 is a cross-sectional view showing the transfer of the part-time four-wheel drive vehicle, FIG. 4 is a perspective view showing the selector lever, FIG. 14 is a view similar to FIG. 1 but showing the driving system and the antiskid brake system of a four-wheel drive vehicle provided with a brake control system in accordance with a fifth embodiment of the present invention, FIG. 19 is a schematic view for illustrating the seventh embodiment of the present invention.

DESCRIPTION OF THE PREFERRED EMBODIMENTS

Figure 1:
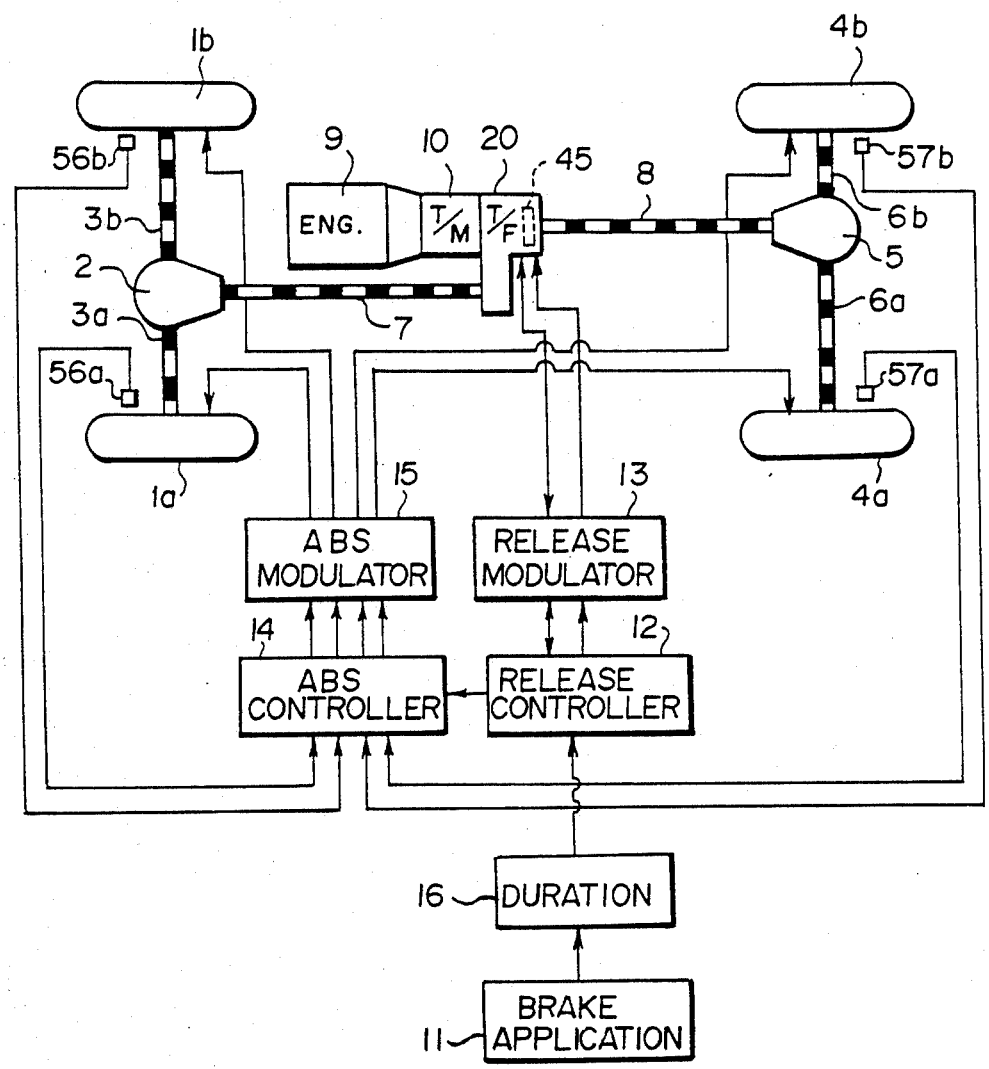
FIG. 1 is a schematic view showing the driving system and the antiskid brake system of a four-wheel drive vehicle provided with a brake control system in accordance with a first embodiment of the present invention.

In the vehicle schematically shown in FIG. 1, the output power of an engine 9 is transmitted to a transfer 20 by way of a transmission 10. The transfer 20 is provided with a drive changing clutch 45 for changing the drive between the four-wheel drive and the two-wheel drive. When the drive is set to the two-wheel drive by the drive changing clutch 45, the engine output power transmitted to the transfer 20 is delivered to a rear drive shaft 8 and drives left and right rear wheels 4a and 4b by way of a rear differential 5 and left and right rear axle shafts 6a and 6b. In this case, the engine output power is not delivered to a front drive shaft 7 with left and right front wheels 1a and 1b being free.

On the other hand, when the drive is set to the four-wheel drive by the drive changing clutch 45, the front drive shaft 7 is drivingly connected to the input shaft of the transfer 20 and thus to the rear drive shaft 8. Thus, the engine output power is delivered to both the front and rear drive shafts 7 and 8 to drive both the front wheels 1a and 1b and the rear wheels 4a and 4b respectively by way of the front and rear differentials 2 and 5 and the front and rear axle shafts 3a, 3b, 6a and 6b.

The drive changing clutch 45 is actuated by a driving connection release modulator 13 under the control of a driving connection release controller 12.

The vehicle shown in FIG. 1 is provided with an antiskid brake system comprising an antiskid controller 14 which calculates the factor of skid for each wheel on the basis of output signals from wheel speed sensors 56a, 56b, 57a and 57b for respectively detecting the rotational speeds of the left and right front wheels 1a and 1b, and the left and right rear wheels 4a and 4b, and an antiskid modulator 15 which controls the hydraulic pressure to the brake for each wheel according to the output signal of the antiskid modulator 15 so that the factor of skid for the corresponding wheel does not exceed a predetermined value. Application of the brakes is detected by a brake application detecting means 11 and duration of application of the brakes is measured by a brake duration determining means 16. When the duration of application of the brakes exceeds a predetermined time, the driving connection release controller 12 first controls the driving connection release modulator 13 to actuate the drive changing clutch 45 to set the drive to the two-wheel drive, and then permits the antiskid controller 14 to control the antiskid modulator 15. Since the driving connection between the front and rear drive shafts 7 and 8 are released when the antiskid controller 14 calculates the factors of skid, precise factors of skid can be obtained. Further since the driving connection is not released or the drive is held to be the four-wheel drive unless the brakes are applied to such a degree that the antiskid brake system is to be actually operated to prevent lock of the wheels, the drive is not changed to the two-wheel drive when the brake pedal is pushed down only lightly or the brake pedal is repeatedly pushed down, whereby adverse influence on the running performance due to release of the driving connection can be minimized.

Application of the brakes can be detected by use of a brake pedal position sensor, a brake pedal switch to be actuated in response to operation of the brake pedal, a brake fluid pressure switch to be actuated according to the brake fluid pressure or the like.

Now the control by the driving connection release controller 12 and the antiskid controller 14 will be described in accordance with the flow chart shown in FIG. 2.

The control is started from step S1, and in step S2, it is determined whether the driving shafts 7 and 8 are drivingly connected with each other by the drive changing clutch 45, that is, whether the drive is set to the four-wheel drive. When it is not determined that the driving shafts 7 and 8 are drivingly connected with each other, the control is immediately ended. (step S3) In this case, the antiskid braking system is operated as soon as the brake pedal is pushed down to control the hydraulic pressure to each brakes if necessary.

When it is determined that the driving shafts 7 and 8 are drivingly connected with each other in the step S2, it is determined whether the brake switch is on, i.e., whether the brake pedal is pushed down in step S4. When it is not determined that the brake switch is on in the step S4, the control is ended in step S5. Otherwise, the duration t of depression of the brake pedal is detected and is compared with a predetermined time To in step S6. When the duration t is shorter than the predetermined time To, it is determined whether the brake switch is off in step S7. When the brake switch is off, the control is ended in step S8, while when the brake switch is on, the step S6 is repeated. Thus, it is determined whether the brake pedal is kept pushed down for a time longer than the predetermined time To. When it is so determined in the step S6, the driving connection release controller 12 delivers a releasing signal to the driving connection release modulator 13 (step S9) to actuate the drive changing clutch 45 to change the drive to the two-wheel drive. (step S10) After it is confirmed that release of the driving connection between the front and rear drive shafts 7 and 8 is completed in step S11, the antiskid brake system is operated in steps S12 to S14.

The antiskid controller 14 calculates the factor of skid for each wheel on the basis of the wheel speed signals from the wheel speed sensors 56a, 56b, 57a and 57b, and generates an actuating signal when the factor of skid exceeds a predetermined value. In the step S12, it is determined whether the actuating signal is on. When the actuating signal is on, the antiskid modulator 15 reduces the hydraulic pressure to the brake corresponding to the wheel having the factor of skid larger than the predetermined value, thereby maximizing the braking effect in the step S13. When it is detected that the factor of skid is reduced and that the actuating signal is turned off in the step S14, the step S12 is repeated. When it is not determined that the actuating signal is on in the step S12, it is determined whether the brake switch is off in step S15. When it is not determined that the brake switch is off, the steps S12 to S14 are repeated.

When it is determined that the brake switch is off in the step S15, the releasing signal is turned off in step S16 and the drive shafts 7 and 8 are drivingly connected again by way of the drive changing clutch 45 in step S17. Then the control is ended. (step S18)

As shown in FIG. 3, the transfer has an input shaft 21 and an output shaft 22 which are coaxially disposed spaced from each other. On the input shaft 21 are mounted a low speed clutch 23 and a high speed clutch 24. The output shaft of the high speed clutch 24 is formed on the inner surface of an input gear 25 formed on the inner end face of the output shaft 22, and when the high speed clutch 24 engages, the output of the input shaft 21 is directly transmitted to the output shaft 22.

On the output side of the low speed clutch 23 is formed an output gear 26 which is supported for rotation of the input shaft 21. The output gear 26 is in mesh with an input side gear 27 of reduction gears formed by the input side gear 27 and an output side gear 28, and the output side gear 28 is in mesh with the input gear 25. The reductions gears 27 and 28 are supported for rotation on a shaft 30 by way of a bearing. The shaft 30 is mounted on a casing 29.

Said drive changing clutch 45 is provided on the output shaft 22. On the output side of the drive changing clutch 45 is formed an output sprocket 31 for driving the front drive shaft 7 and is supported for rotation on the output shaft 22. On the lower portion of the casing 29 is supported for rotation by way of a bearing an input sprocket 32 for driving the front drive shaft 7. A chain 33 is passed around the input sprocket 32 and the output sprocket 31. Thus, when the low speed clutch 23 is engaged, the output shaft 22 is driven by way of the output gear 26, the reduction gears 27 and 28, and the input gear 25, and on the other hand, when the high speed clutch 24 is engaged, the output shaft 22 is directly driven. Further, when the drive changing clutch 45 is engaged, the driving force of the output shaft 22 is transmitted to the input sprocket 32 by way of the output sprocket 31 and the chain 33.

A flange 34 fixed to the outer end of the output shaft 22 drives the rear wheels 4a and 4b connected to the rear drive shaft 8 and a flange 35 formed on the output side of the input sprocket 32 drives the front wheels 1a and 1b connected to the front drive shaft 7.

On the lower portion of the casing 29 are provided a pressure regulator valve 36, a manual valve 37 and a shift valve 38.

The pressure regulator valve 36 regulates the discharge pressure of an oil pump 39 provided on the input side of the input shaft 21 to a constant pressure.

The manual valve 37 controls the drive changing clutch 45 in response to driver's operation of a selector lever 40 (FIG. 4).

The shift valve 38 is actuated by the driving connection release modulator 13 under the control of the driving connection release controller 12 to control the drive changing clutch 45 to change the drive between the four-wheel drive and the two-wheel drive.

A hydraulic line 42 is connected between the shift valve 38 and the backside of a piston 43 of the drive changing clutch 45, and the piston 43 engages the drive changing clutch 45 under the hydraulic pressure transmitted thereto through the hydraulic line 42. The low speed clutch 23 and the high speed clutch 24 have substantially the same structure.

As shown in FIG. 4, the selector lever 40 can be selectively positioned in one of the four positions respectively indicated at A, B, C and D. When the selector lever 40 is in the position A, the drive changing clutch 45 is controlled by a separate controller (not shown) to automatically change the drive between the two-wheel drive and the four-wheel drive according to the running condition. In this case, when the drive is changed to the four-wheel drive, the high speed clutch 24 is automatically engaged and the four-wheel drive in this position is limited to the high speed.

When the selector lever 40 is in the position B, the drive changing clutch 45 is disengaged and the drive is set to the two-wheel drive. In the position C, the drive changing clutch 45 and the high speed clutch 24 are engaged to set the drive to the high speed four-wheel drive. In the position D, the drive changing clutch 45 and the low speed clutch 23 are engaged to set the drive to the low speed four-wheel drive.

The transfer shown in FIG. 3 is for the part-time four-wheel drive. A transfer 60 for the full-time four-wheel drive will be described with reference to FIGS. 5 and 6, hereinbelow.

Figure 5:
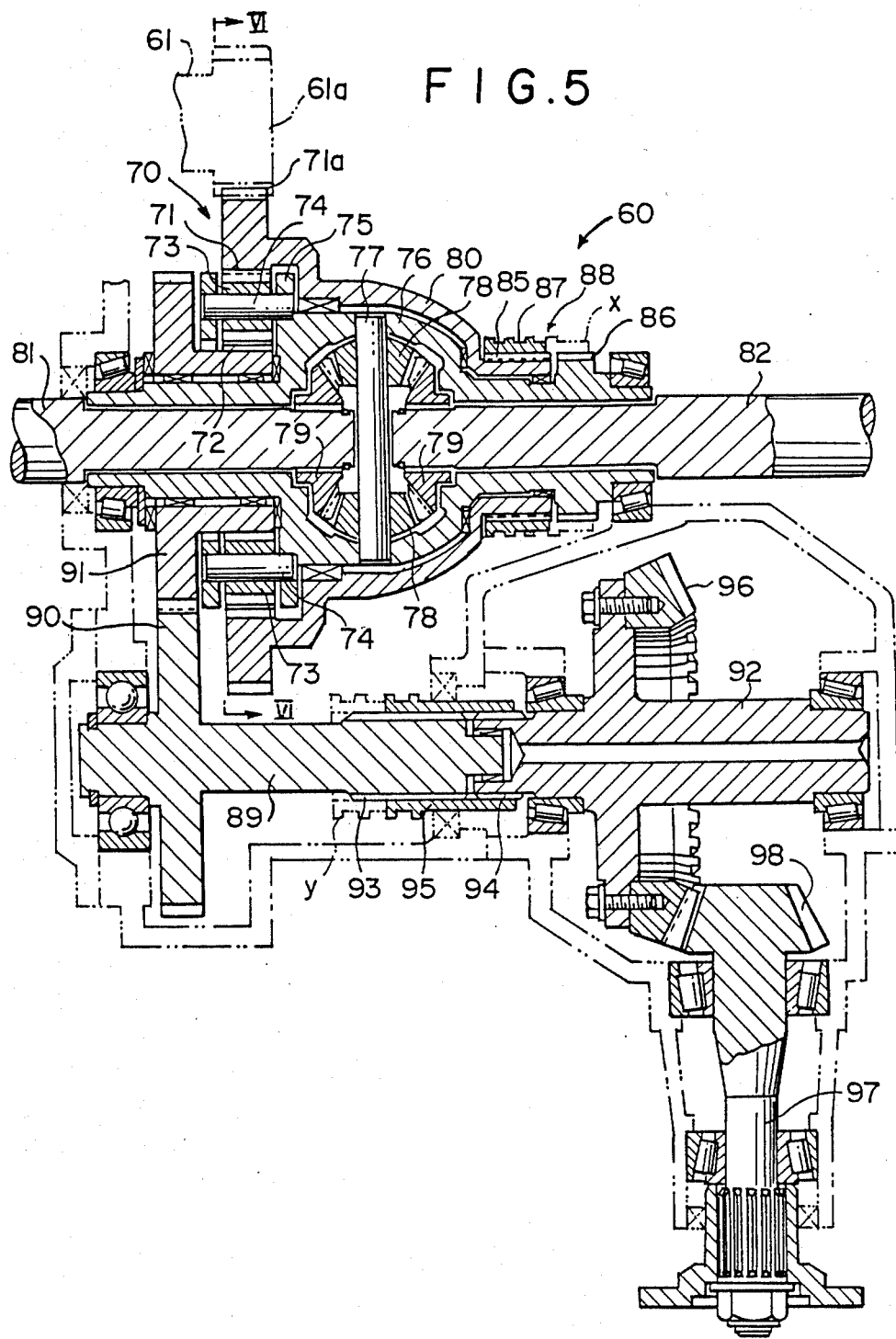
FIG. 5 is a cross-sectional view showing the transfer of the full-time four-wheel drive vehicle.
Figure 6:
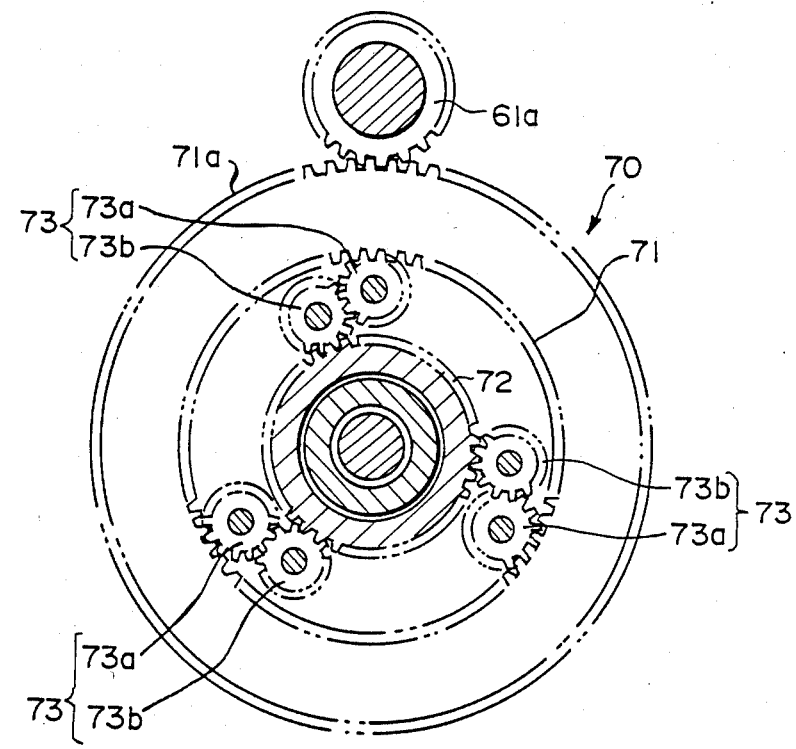
FIG. 6 is a cross-sectional view taken along line VI—VI in FIG. 5.

In FIG. 5, a transmission output shaft 61 having a drive gear 61a on one end thereof extends in the transverse direction of the vehicle body. The drive gear 61a is in mesh with an input gear 71a integrally formed on the outer peripheral surface of a ring gear 71 of a center differential 70.

The center differential 70 is formed by a planetary gear mechanism comprising the ring gear 71, a sun gear 72 disposed coaxially with the ring gear 71, a plurality of pinions 73 in mesh with the ring gear 71 and the sun gear 72, and a pinion carrier 75 carrying the pinions 73 by way of pins 74. As clearly shown in FIG. 6, each pinion 73 is a double pinion comprising a first pinion 73a in mesh with the ring gear 71 and a second pinion 73b in mesh with the sun gear 72 and the first pinion 73a.

On the right side of the center differential 70 is disposed a front differential 80 comprising a differential case 76, a pair of pinions 78 supported for rotation on a radial pin 77 which is supported on the differential case 76 at opposite ends, and a pair of bevel gears 79 in mesh with the pinions 78. Left and right front axle shafts 81 and 82 are respectively connected to the left and right bevel gears 79. The left front axle shaft 81 extends through the center differential 70.

The pinion carrier 75 of the center differential 70 is formed integrally with the differential case 76 of the front differential case 76. The ring gear 71 and the pinion carrier 75 (the differential case 76) are elongated rightward to extend beyond the front differential 80. A spline 85 is formed on the end portion of the extension of the ring gear 71 and a spline 86 is formed on the end portion of the extension of the pinion carrier 75. The splines 85 and 86 are disposed adjacent to each other, and a slider 87 is put on the spline 85 to be slidable between a locking position shown by chained line x in which the left half of the slider 87 engages with the spline 85 and the other half of the slider 87 engages with the spline 86 to connect the ring gear 71 and the pinion carrier 75, and a retracted position in which the slider 87 is retracted away from the spline 86 to release the connection between the ring gear 71 and the pinion carrier 75. That is, the splines 85 and 86 and the slider 87 form a differential lock mechanism 88. Thus, the center differential 70, the front differential 80 and the differential lock mechanism 88 for the center differenial 70 are coaxially arranged with the front differential 80 being positioned between the others.

An intermediate shaft 89 is disposed in parallel to the central axis of the center differential 70 or the front differential 80 spaced therefrom. A gear 90 integrally formed on the intermediate shaft 89 is in mesh with a gear 91 integrally formed on the sun gear 72 of the center differential 70. A second intermediate shaft 92 is disposed to be aligned with the intermediate shaft 89. Splines 93 and 94 are respectively formed on the opposed ends of the intermediate shaft 89 and the second intermediate shaft 92. A slider 95 is put on the spline 93 to be slidable between a locking position in which the left half of the slider 95 engages with the spline 93 and the other half of the slider 95 engages with the spline 94 to drivingly connect the intermediate shaft 89 and the second intermediate shaft 92 and a retracted position in which the slider 95 is retracted away from the spline 94 to release the driving connection between the intermediate shaft 89 and the second intermediate shaft 92 as shown by chained line y in FIG. 5. The second intermediate shaft 92 is provided with an output gear 96 and a bevel gear 98 integrally formed on a rear drive shaft 97 is in mesh with the output gear 96.

The engine output power transmitted through the transmission is delivered to the ring gear 71 of the center differential 70 by way of the drive gear 61a of the output shaft 61 of the transmission and the input gear 71a of the center differential 70. The engine output power is transmitted to both the pinion carrier 75 and the sun gear 72 by way of the center differential 60. The engine output power transmitted to the pinion carrier 75 is further transmitted to the front axle shafts 81 and 82 to drive the front wheels. The engine output power transmitted to the sun gear 72 drives the rear drive shaft 97 by way of the gears 91 and 90, the intermediate shafts 89 and 92, and the output gear 96. As can be understood from the description above, when the slider 95 is moved to the retracting position shown by the chained line y, the intermediate shafts 89 and 92 are disconnected from each other, and the engine output power is not transmitted to the rear drive shaft 97. That is, by controlling the slider 95, the drive can be changed between the two-wheel drive and the four-wheel drive.

When the slider 87 of the differential locking mechanism 88 is moved to the locking position shown by the chained line x with the intermediate shafts 89 and 92 being drivingly engaged with each other, the ring gear 71 and the pinion carrier 75 is directly connected to lock the center differential 70.

Figure 2:
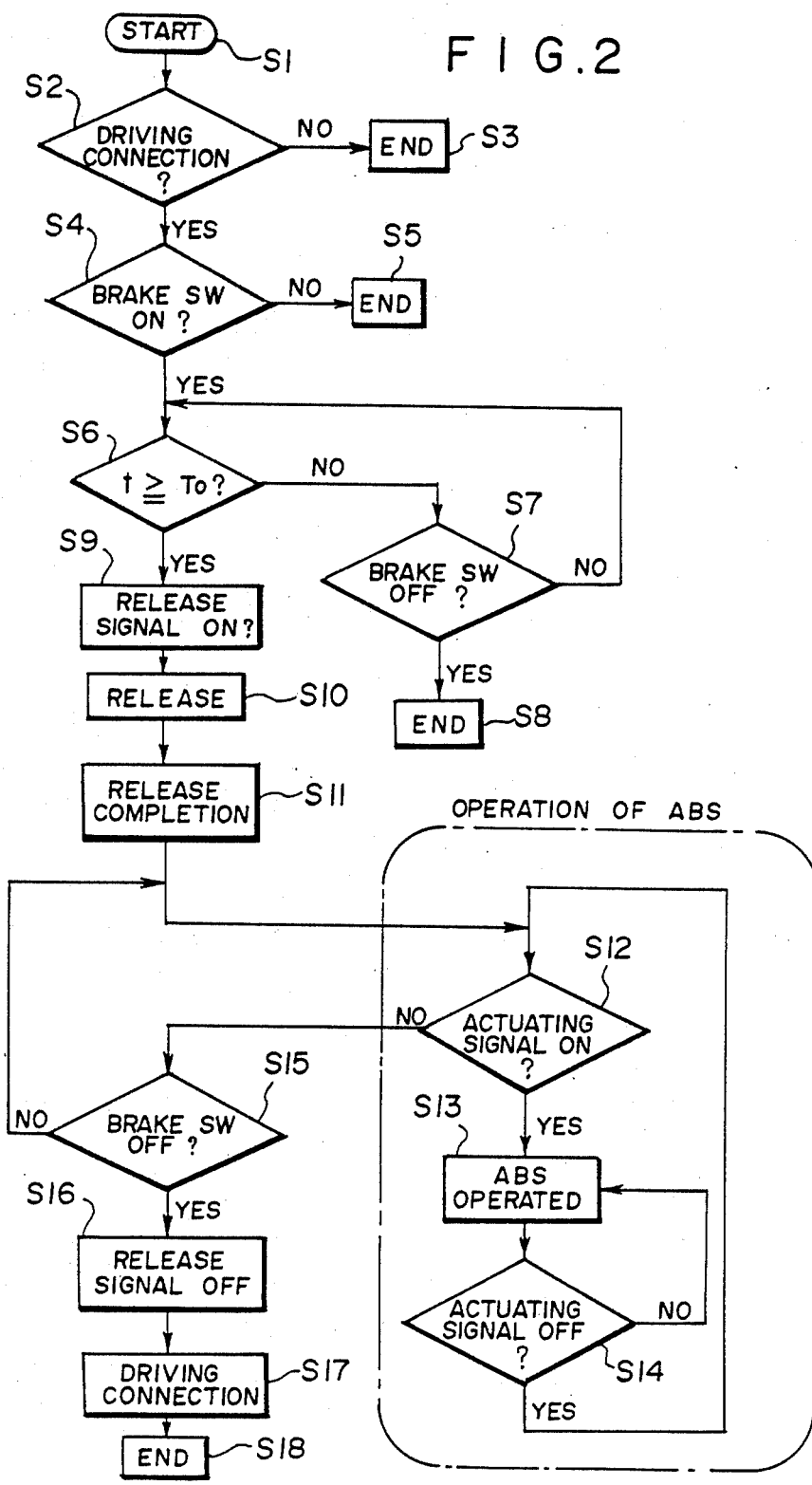
FIG. 2 is a flow chart for illustrating the control to be made by the driving connection release controller and the antiskid controller in the first embodiment.

In the step S11 in FIG. 2, completion of release of the driving connection between the front and rear drive shafts is confirmed. This can be done, for instance, by providing a pressure sensor for detecting the hydraulic pressure in the hydraulic line 42 for feeding hydraulic pressure to the piston 43 of the drive changing clutch 45, as shown by dotted line in FIG. 3.

Now a second embodiment of the present invention will be described with reference to FIGS. 7 and 8.

Figure 7:
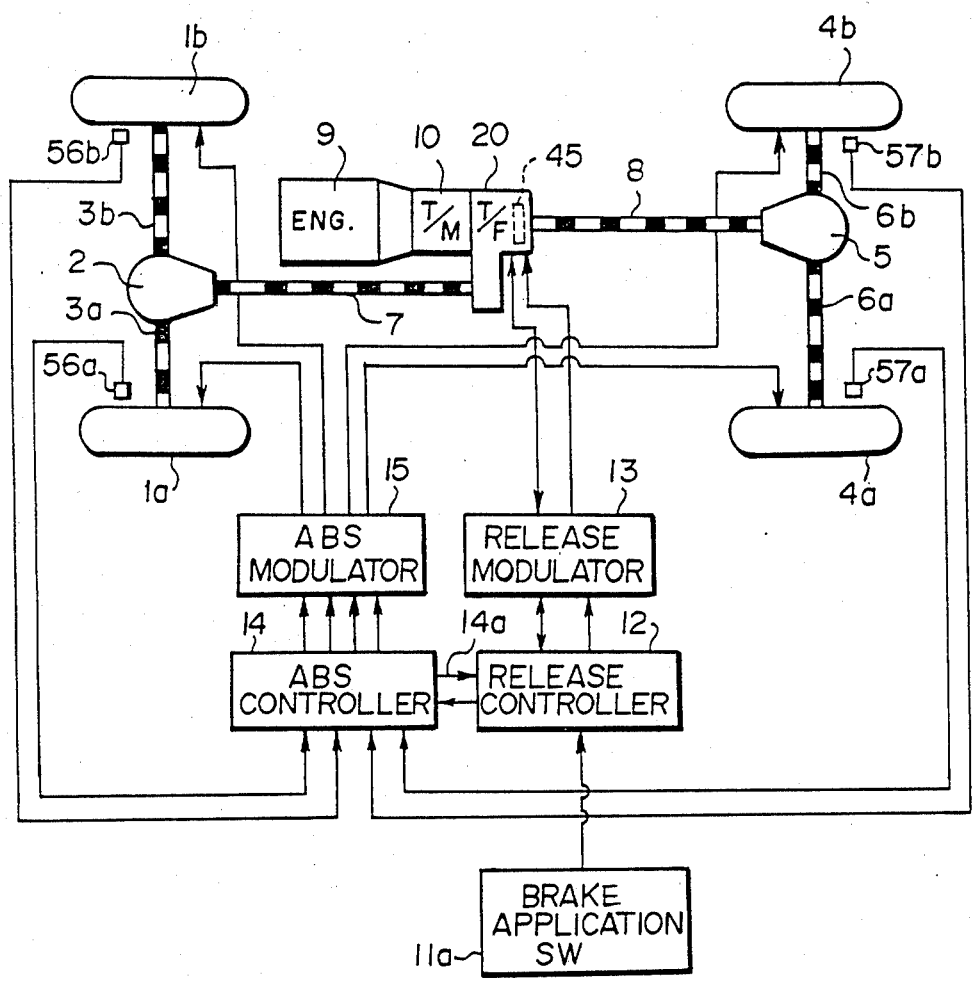
FIG. 7 is a view similar to FIG. 1 but showing the driving system and the antiskid brake system of a four-wheel drive vehicle provided with a brake control system in accordance with a second embodiment of the present invention.

FIG. 7 is a schematic view showing a vehicle provided with a brake control system in accordance with a second embodiment of the present invention. As can be seen from FIG. 7, the arrangement of FIG. 7 is very similar to that shown in FIG. 1, and accordingly, the parts corresponding to the parts shown in FIG. 1 are given the same reference numerals and the description will be made mainly on the difference between the first embodiment and the second embodiment, hereinbelow. Though the driving connection between the front and rear drive shafts is released when the duration of application of the brakes exceeds the predetermined time in the first embodiment, the driving connection is released when the deceleration of the wheel speed exceeds a predetermined value in the second embodiment. That is, in this embodiment, it is determined that the brakes are applied over a predetermined level to such a degree that can lead to locking of the wheels when the deceleration of the vehicle speed exceeds the predetermined value. In FIG. 7, a brake application signal is input into the driving connection release controller 12 from a brake application switch 11a when the brake pedal is pushed down, and at the same time, the antiskid controller 14 calculates the deceleration of the wheel speed by differentiating the rotational speed of the wheels with time and delivers a wheel speed deceleration signal 14a to the driving connection release controller 12. The driving connection release controller 12 controls the driving connection release modulator 13 to actuate the drive changing clutch 45 to set the drive to the two-wheel drive, and then permits the antiskid controller 14 to control the antiskid modulator 15 when the deceleration of the wheels represented by the wheel speed deceleration signal 14a exceeds the predetermined value. Also in this embodiment, the effect which can be enjoyed in the first embodiment can be enjoyed.

Now the control to be made by the driving connection release controller 12 and the antiskid controller 14 in the second embodiment will be described in accordance with the flow chart shown in FIG. 8.

The control is started from step S1, and in step S2, it is determined whether the driving shafts 7 and 8 are drivingly connected with each other by the drive changing clutch 45, that is, whether the drive is set to the four-wheel drive. When it is not determined that the driving shafts 7 and 8 are drivingly connected with each other, the control is immediately ended. (step S3) In this case, the antiskid braking system is operated as soon as the brake pedal is pushed down to control the hydraulic pressure to each brakes if necessary.

When it is determined that the driving shafts 7 and 8 are drivingly connected with each other in the step S2, it is determined whether the brake pedal is pushed down in step S4. When it is not determined that the brake pedal is pushed down in the step S4, the control is ended in step S5. Otherwise, the deceleration of the wheel speed Ba is read in step S6, and the deceleration of the wheel speed Ba is compared with a predetermined value Bn in step S7. When it is not determined that the deceleration of the wheel speed Ba is not smaller than the predetermined value in the step S7, it is determined whether the brake switch is off in step S8. When the brake switch is off, the control is ended in step S9, while when the brake switch is on, the step S6 is repeated. When it is determined that the deceleration of the wheel speed Ba is not smaller than the predetermined value Bn in the step S7, the driving connection release controller 12 delivers a releasing signal to the driving connection release modulator 13 (step S10) to actuate the drive changing clutch 45 to change the drive to the two-wheel drive. (step S11) After it is confirmed that release of the driving connection between the front and rear drive shafts 7 and 8 is completed in step S12, the antiskid brake system is operated in steps S13 to S15.

The antiskid controller 14 calculates the factor of skid for each wheel on the basis of the wheel speed signals from the wheel speed sensors 56a, 56b, 57a and 57b, and generates an actuating signal when the factor of skid exceeds a predetermined value. In the step S13, it is determined whether the actuating signal is on. When the actuating signal is on, the antiskid modulator 15 reduces the hydraulic pressure to the brake corresponding to the wheel having the factor of skid larger than the predetermined value, thereby maximizing the braking effect in the step S14. When it is detected that the factor of skid is reduced and that the actuating signal is turned off in the step S15, the step S13 is repeated. When it is not determined that the actuating signal is on in the step S13, it is determined whether the brake switch is off in step S16. When it is not determined that the brake switch is off, the steps S13 to S15 are repeated.

When it is determined that the brake switch is off in the step S16, the releasing signal is turned off in step S17 and the drive shafts 7 and 8 are drivingly connected again by way of the drive changing clutch 45 in step S18. Then the control is ended. (step S19)

Figure 9:
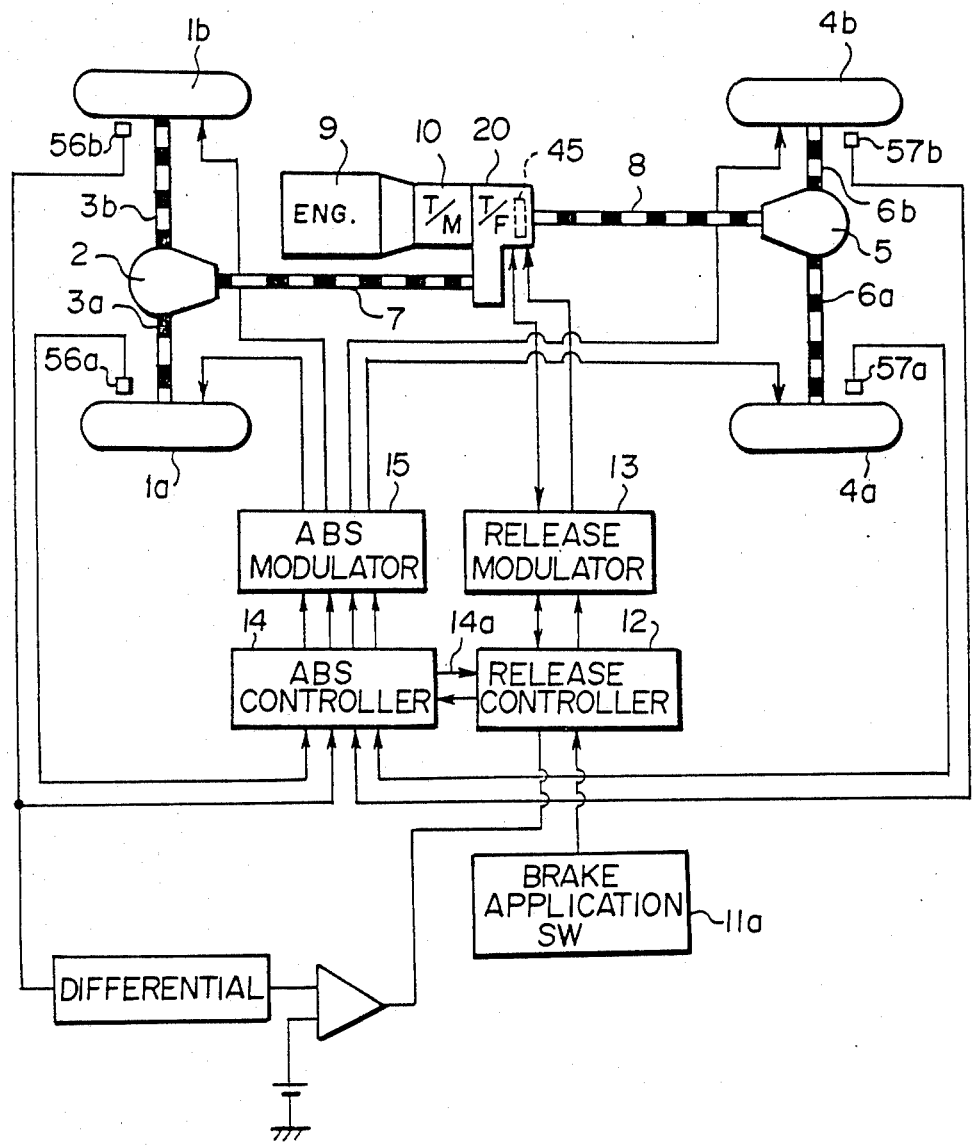
FIG. 9 is a view similar to FIG. 7 but showing a modification of the second embodiment.

The wheel speed deceleration signal is delivered to the driving connection release controller 12 from the antiskid controller 14 in the second embodiment. However, the wheel speed deceleration signal may be obtained by separately providing a differential circuit and a comparator as shown in FIG. 9.

Now a third embodiment of the present invention will be described with reference to FIGS. 10 and 11.

Figure 10:
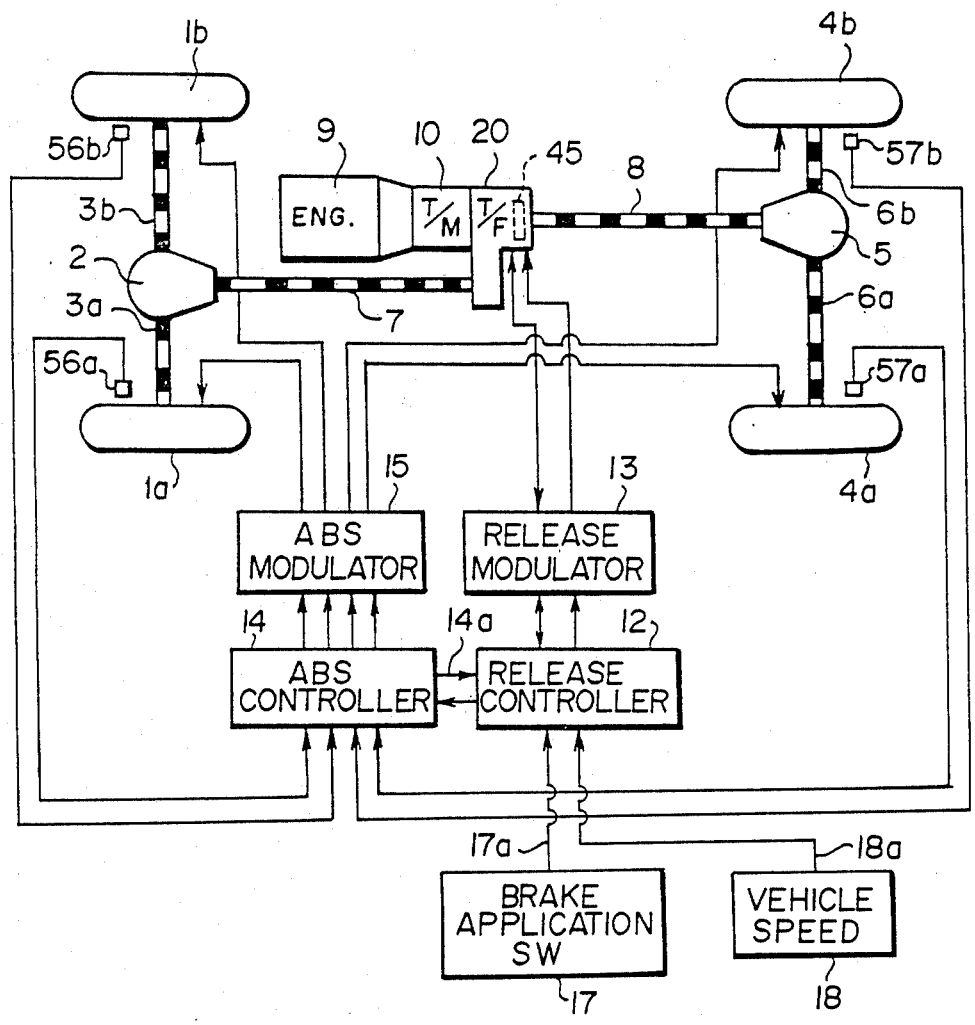
FIG. 10 is a view similar to FIG. 1 but showing the driving system and the antiskid brake system of a four-wheel drive vehicle provided with a brake control system in accordance with a third embodiment of the present invention.

FIG. 10 is a schematic view showing a vehicle provided with a brake control system in accordance with a third embodiment of the present invention. As can be seen from FIG. 10, the arrangement of FIG. 10 is very similar to that shown in FIG. 7, and accordingly, the parts corresponding to the parts shown in FIG. 7 are given the same reference numerals and the description will be made mainly on the difference between the first embodiment and the second embodiment, hereinbelow.

Though in the second embodiment described above, the predetermined value Bn of the deceleration of the wheel speed which defines the lower limit of the degree of the application of the brakes that can lead to locking of the wheels is fixed irrespective of the vehicle speed, the predetermined value Bn is increased with the vehicle speed in the third embodiment. It is preferred that the predetermined value Bn be increased with the vehicle speed since the wheels can be less decelerated before being locked when the vehicle speed is low than when the vehicle speed is high. That is, in this embodiment, it is determined that the brakes are applied over a predetermined level to such a degree that can lead to locking of the wheels when the deceleration of the wheel speed exceeds the predetermined value which is increased with the vehicle speed.

In FIG. 10, a vehicle speed signal 18a from a vehicle speed sensor 18 is input into the driving connection release controller 12 together with a brake application signal 17a from a brake application switch 17 and the wheel speed deceleration signal 14a from the antiskid controller 14. The driving connection release controller 12 controls the driving connection release modulator 13 to actuate the drive changing clutch 45 to set the drive to the two-wheel drive, and then permits the antiskid controller 14 to control the antiskid modulator 15 when the deceleration of the wheels represented by the wheel speed deceleration signal 14a exceeds the predetermined value Bn is varied with the vehicle speed.

Now the control to be made by the driving connection release controller 12 and the antiskid controller 14 in the third embodiment will be described in accordance with the flow chart shown in FIG. 11.

The control is started from step S1, and in step S2, it is determined whether the driving shafts 7 and 8 are drivingly connected with each other by the drive changing clutch 45, that is, whether the drive is set to the four-wheel drive. When it is not determined that the driving shafts 7 and 8 are drivingly connected with each other, the control is immediately ended. (step S3) In this case, the antiskid braking system is operated as soon as the brake pedal is pushed down to control the hydraulic pressure to each brakes if necessary.

When it is determined that the driving shafts 7 and 8 are drivingly connected with each other in the step S2, it is determined whether the brake pedal is pushed down in step S4. When it is not determined that the brake pedal is pushed down in the step S4, the control is ended in step S5. Otherwise, the vehicle speed is read in step S6, and the predetermined value Bn is determined according to the vehicle speed in step S7. Then, the deceleration of the wheel speed Ba is read in step S8, and the deceleration of the wheel speed Ba is compared with a predetermined value Bn determined in step S9. When it is not determined that the deceleration of the wheel speed Ba is not smaller than the predetermined value in the step S9, it is determined whether the brake switch is off in step S10. When the brake switch is off, the control is ended in step S11, while when the brake switch is on, the step S6 is repeated. When it is determined that the deceleration of the wheel speed Ba is not smaller than the predetermined value Bn in the step S9, the driving connection release controller 12 delivers a releasing signal to the driving connection release modulator 13 (step S12) to actuate the drive changing clutch 45 to change the drive to the two-wheel drive. (step S13) After it is confirmed that release of the driving connection between the front and rear drive shafts 7 and 8 is completed in step S14, the antiskid brake system is operated in steps S15 to S17.

Figure 8:
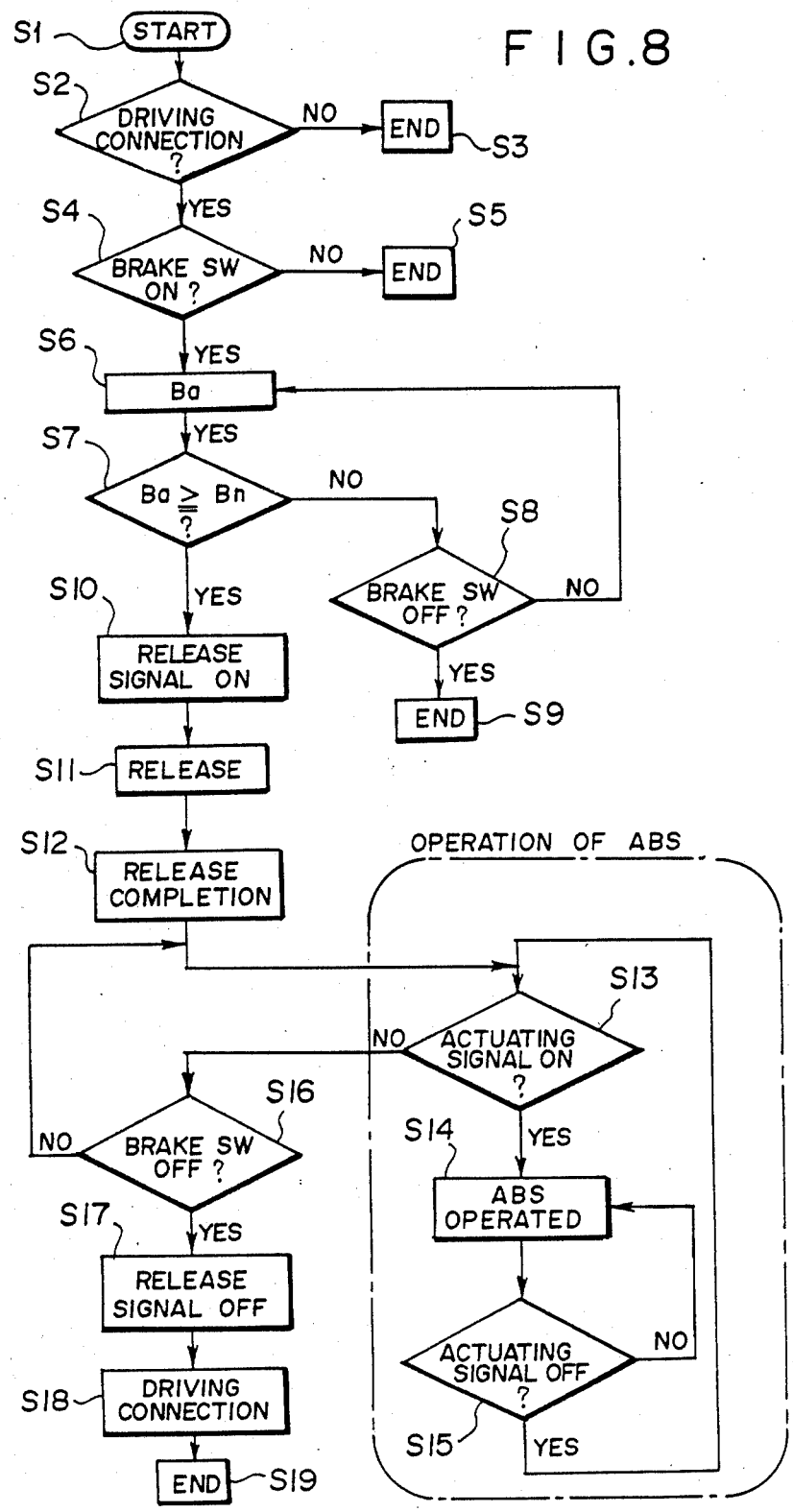
FIG. 8 is a flow chart for illustrating the control to be made by the driving connection release controller and the antiskid controller in the second embodiment.
Figure 11:
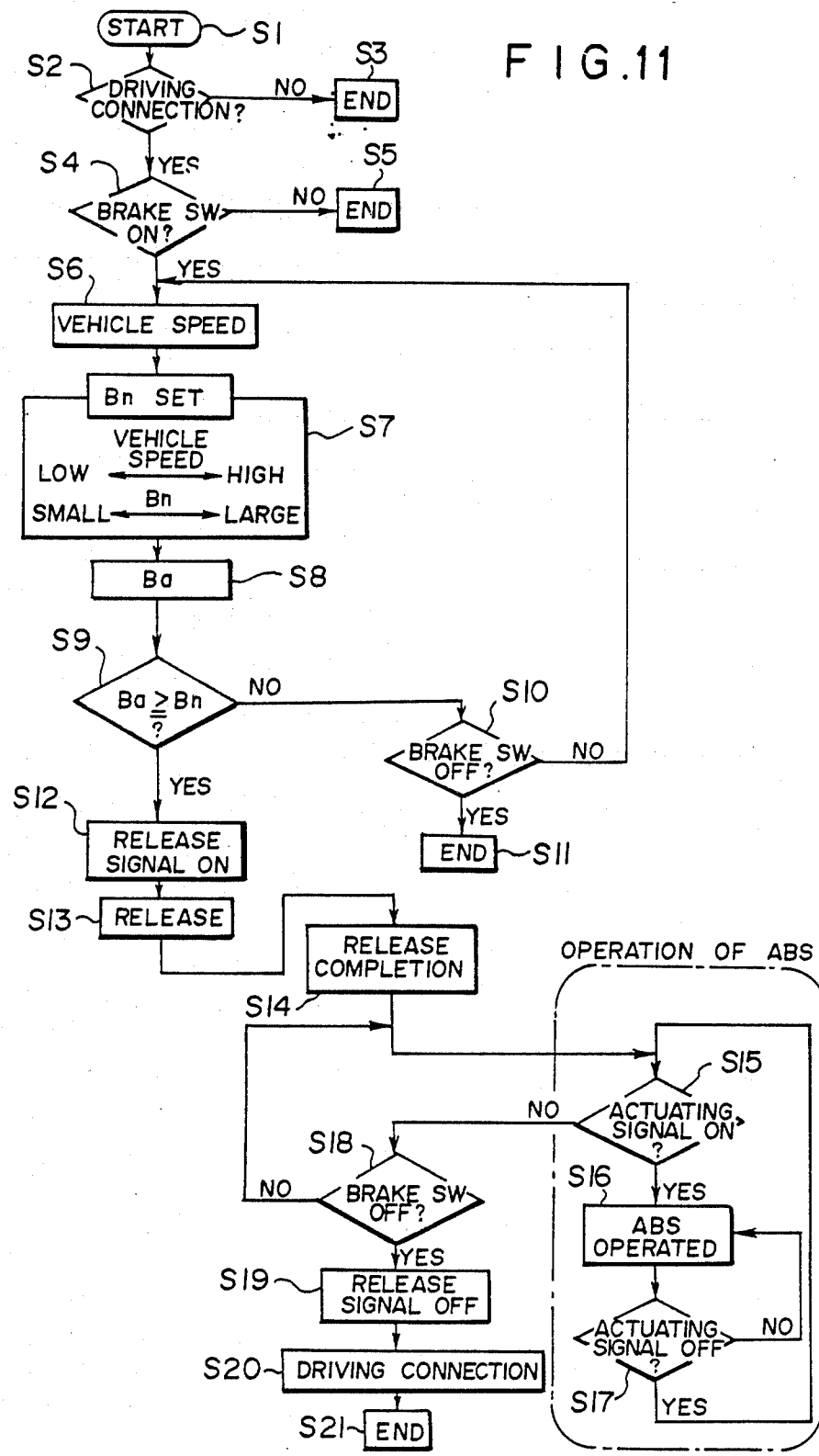
FIG. 11 is a flow chart for illustrating the control to be made by the driving connection release controller and the antiskid controller in the third embodiment.

Since the steps S15 to S21 in FIG. 11 is the same as the steps S13 to S19 in FIG. 8, they will not be described here.

Figure 12:
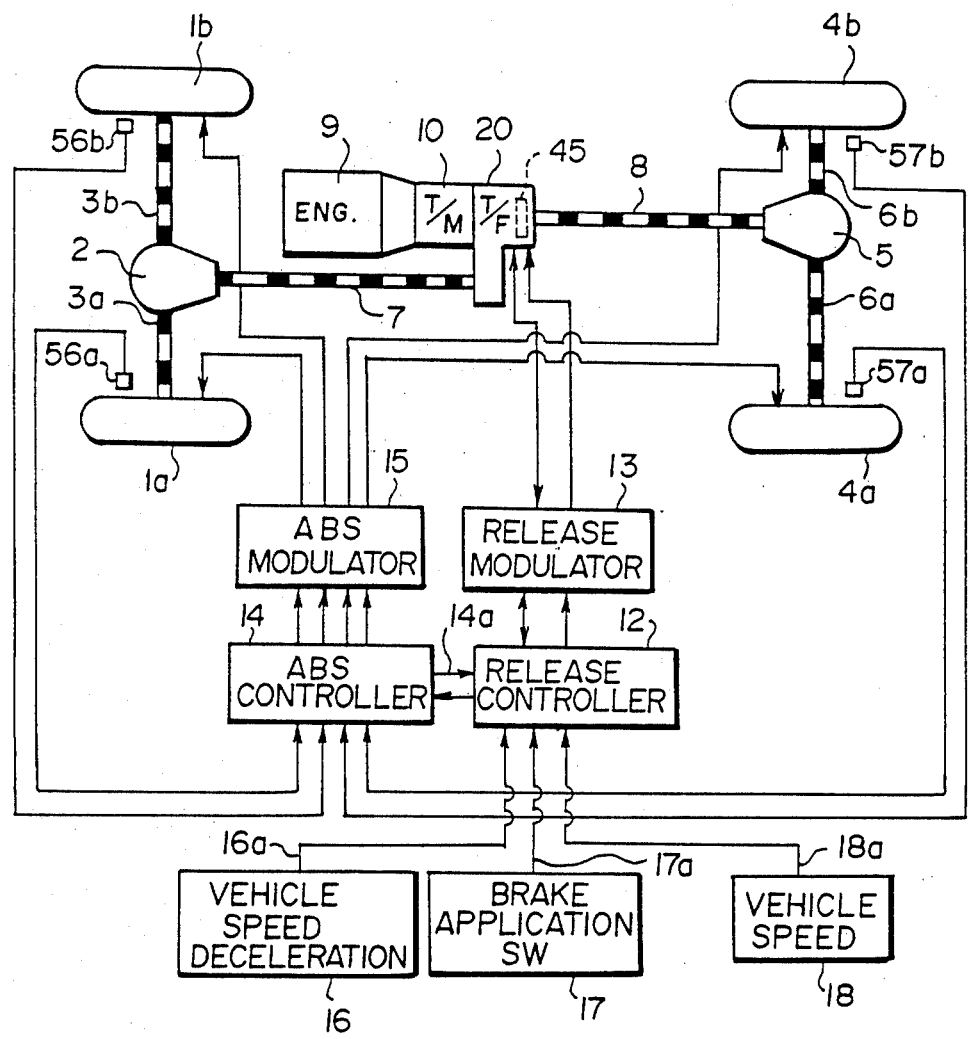
FIG. 12 is a view similar to FIG. 1 but showing the driving system and the antiskid brake system of a four-wheel drive vehicle provided with a brake control system in accordance with a fourth embodiment of the present invention.
Figure 13:
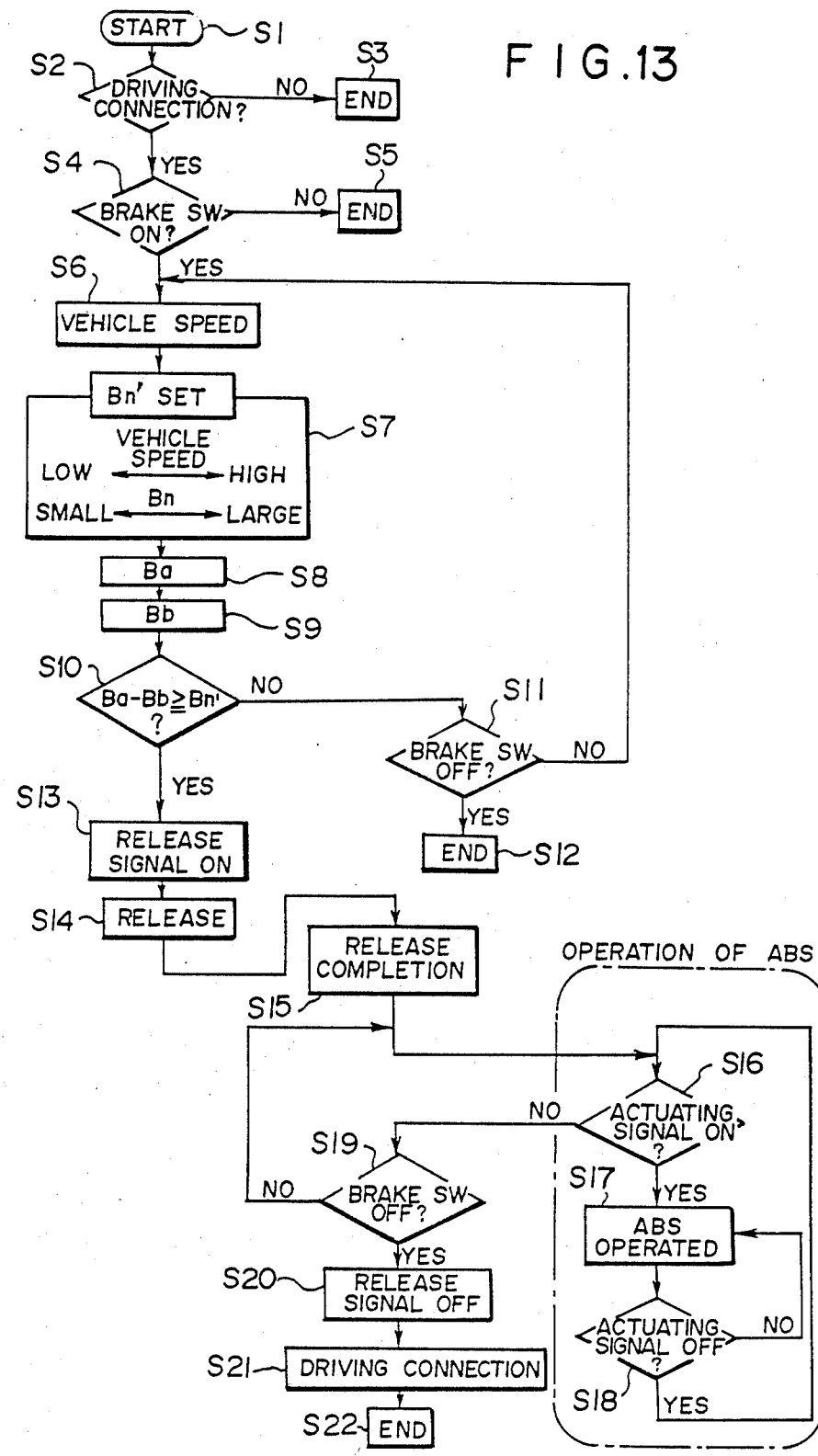
FIG. 13 is a flow chart for illustrating the control to be made by the driving connection release controller and the antiskid controller in the fourth embodiment.

In fourth embodiment of the present invention shown in FIG. 12, the degree of application of the brakes is detected through the difference between the deceleration of the wheel speed and the deceleration of the vehicle speed instead of the deceleration of the wheel speed. Accordingly, in the fourth embodiment, a vehicle speed deceleration signal 16a is input into the driving connection release controller 12 in addition to the signals input into the same in the third embodiment. The control to be made by the driving connection release controller 12 and the antiskid controller 14 in the fourth embodiment is shown in FIG. 13. In step S7, a predetermined value Bn' of the difference between the deceleration of the wheel speed Ba and the deceleration of the vehicle speed Bb is determined according to the vehicle speed. Then in steps S8 and S9, the deceleration of the wheel speed Ba and the deceleration of the vehicle speed Bb are respectively read, and the difference therebetween is compared with the predetermined value Bn' determined in the step S7. The other steps will be apparent to those skilled in the art from the description above, and accordingly will not be described here.

Generally, the wheels are more apt to be locked as the friction coefficient $\mu$ of the road surface becomes smaller. Accordingly it is preferred that the reference for determining whether the application of the brakes is to such a degree that can lead to locking of the wheels be changed according to the friction coefficient $\mu$ of the road surface.

Figure 15:
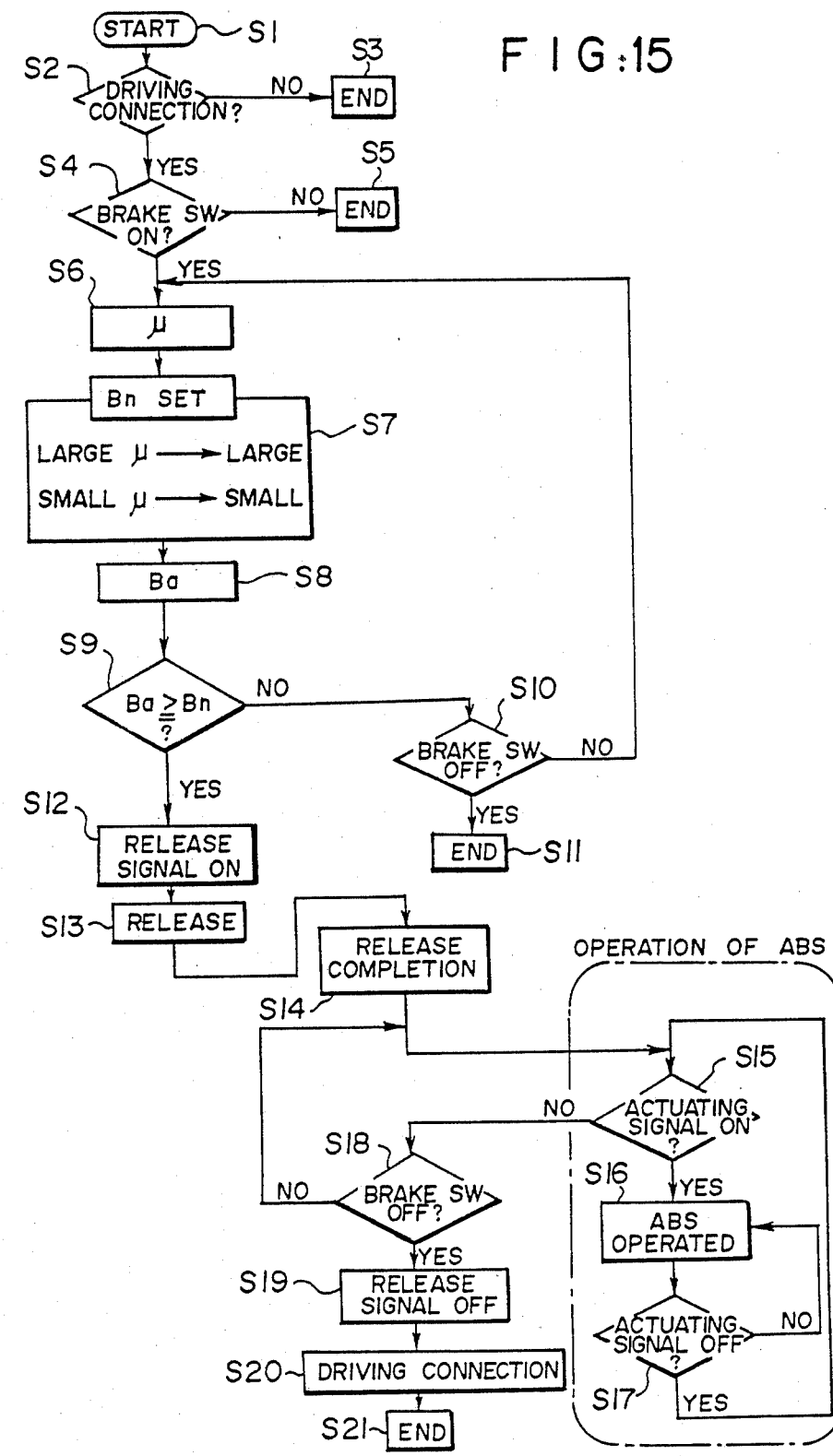
FIG. 15 is a flow chart for illustrating the control to be made by the driving connection release controller and the antiskid controller in the fifth embodiment.

In the fifth embodiment of the present invention shown in FIG. 14, it is determined that the brakes are applied over the predetermined level when the deceleration of the wheel speed Ba exceeds a predetermined value Bn which is reduced with reduction of the friction coefficient $\mu$ of the road surface. Accordingly, a road surface friction signal 19a from a road surface friction sensor 19 is input into the driving connection release controller 12 instead of the vehicle speed signal 18a in the third embodiment shown in FIG. 10. The control to be made by the driving connection release controller 12 and the antiskid controller 14 in the fifth embodiment is shown in FIG. 15. The control to be made by the driving connection release controller 12 and the antiskid controller 14 in the fifth embodiment is substantially the same as the control to be made in the third embodiment except that the predetermined value Bn is changed according to the friction coefficient of the road surface instead of the vehicle speed, and accordingly will not be described here.

Figure 16:
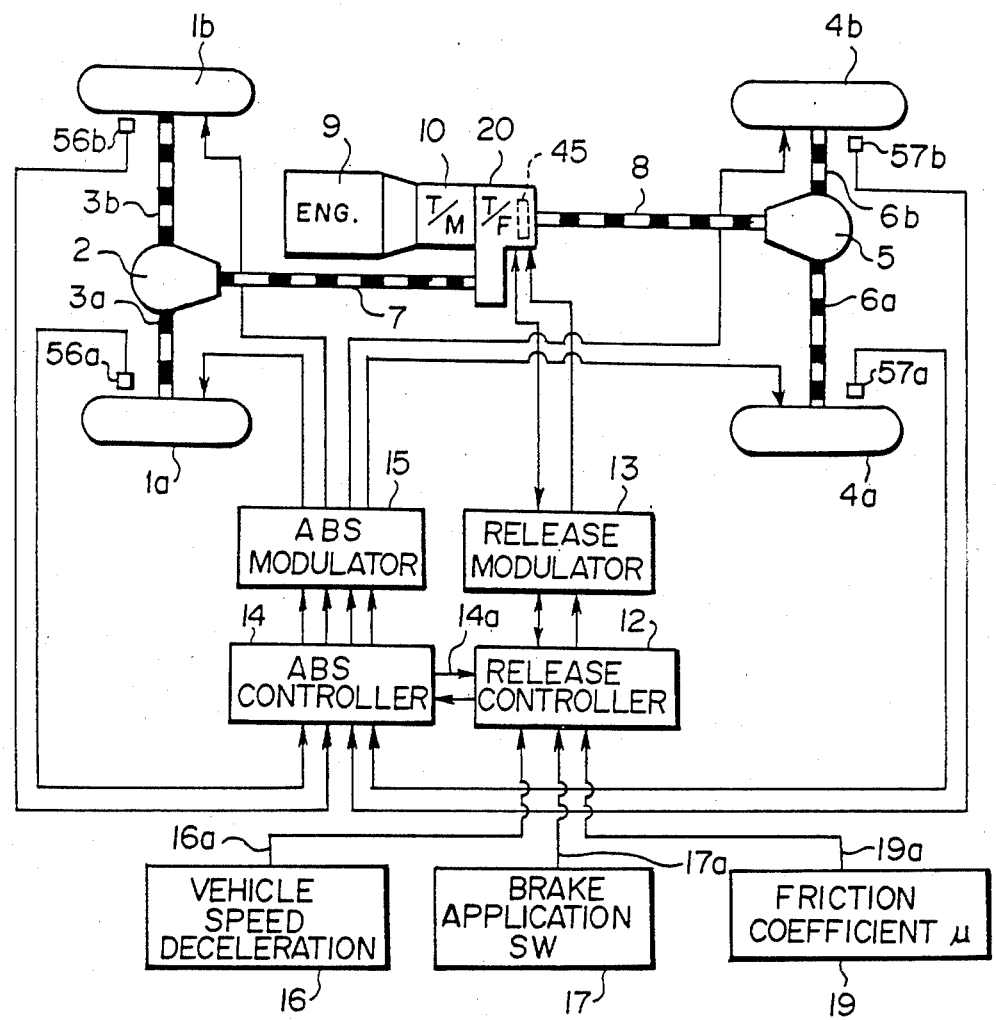
FIG. 16 is a view similar to FIG. 1 but showing the driving system and the antiskid brake system of a four-wheel drive vehicle provided with a brake control system in accordance with a sixth embodiment of the present invention.
Figure 17:
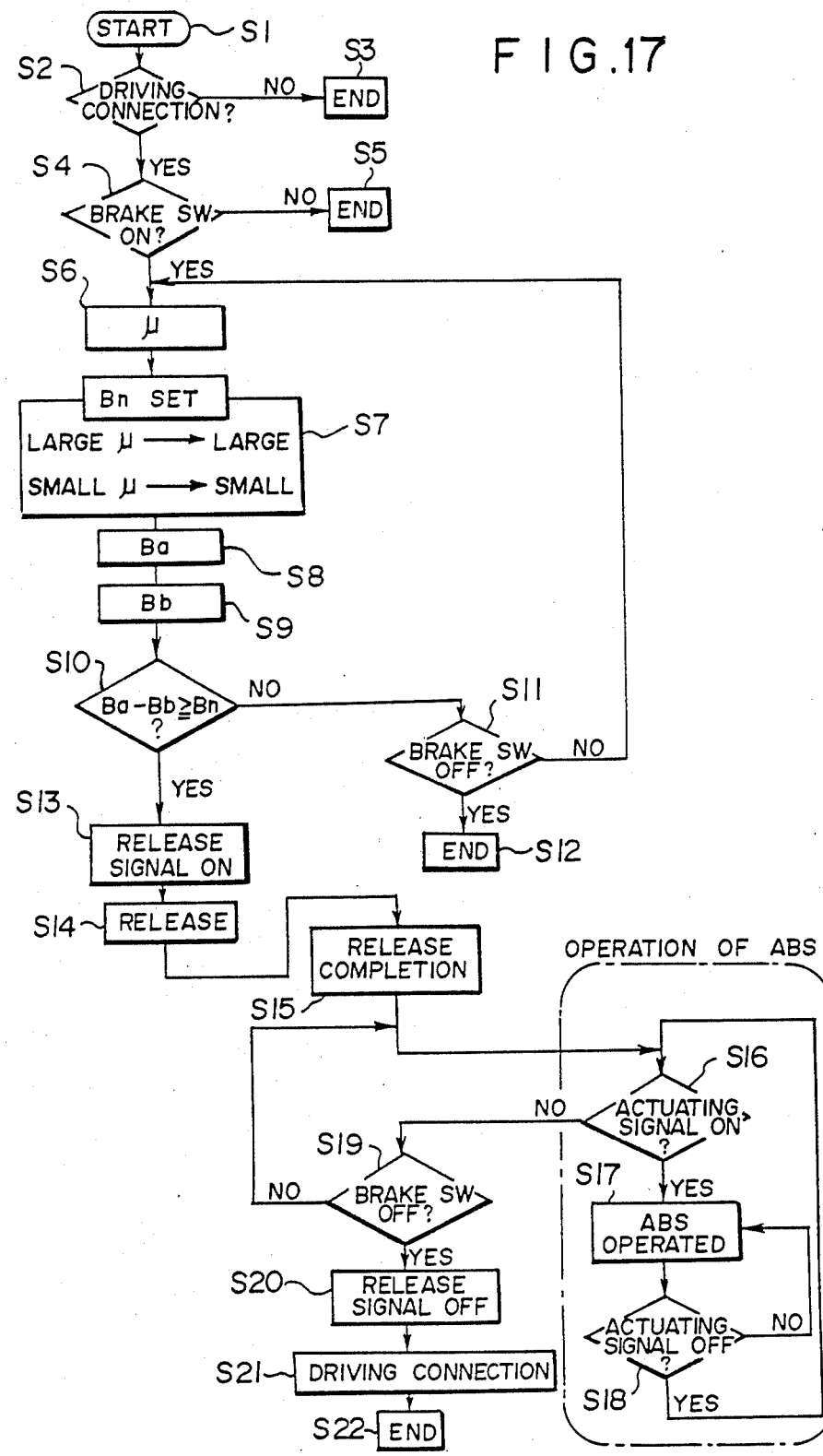
FIG. 17 is a flow chart for illustrating the control to be made by the driving connection release controller and the antiskid controller in the sixth embodiment.

In the sixth embodiment of the present invention shown in FIG. 16, it is determined that the brakes are applied over the predetermined level when the difference between the deceleration of the wheel speed Ba and the deceleration of the vehicle speed Bb exceeds a predetermined value Bn' which is reduced with reduction of the friction coefficient $\mu$ of the road surface. Accordingly, a road surface friction signal 19a from a road surface friction sensor 19 is input into the driving connection release controller 12 instead of the vehicle speed signal 18a in the fourth embodiment shown in FIG. 12. The control to be made by the driving connection release controller 12 and the antiskid controller 14 in the sixth embodiment is shown in FIG. 17. The control to be made by the driving connection release controller 12 and the antiskid controller 14 in the sixth embodiment is substantially the same as the control to be made in the fourth embodiment except that the predetermined value Bn' is changed according to the friction coefficient of the road surface instead of the vehicle speed, and accordingly will not be described here.

Figure 18:
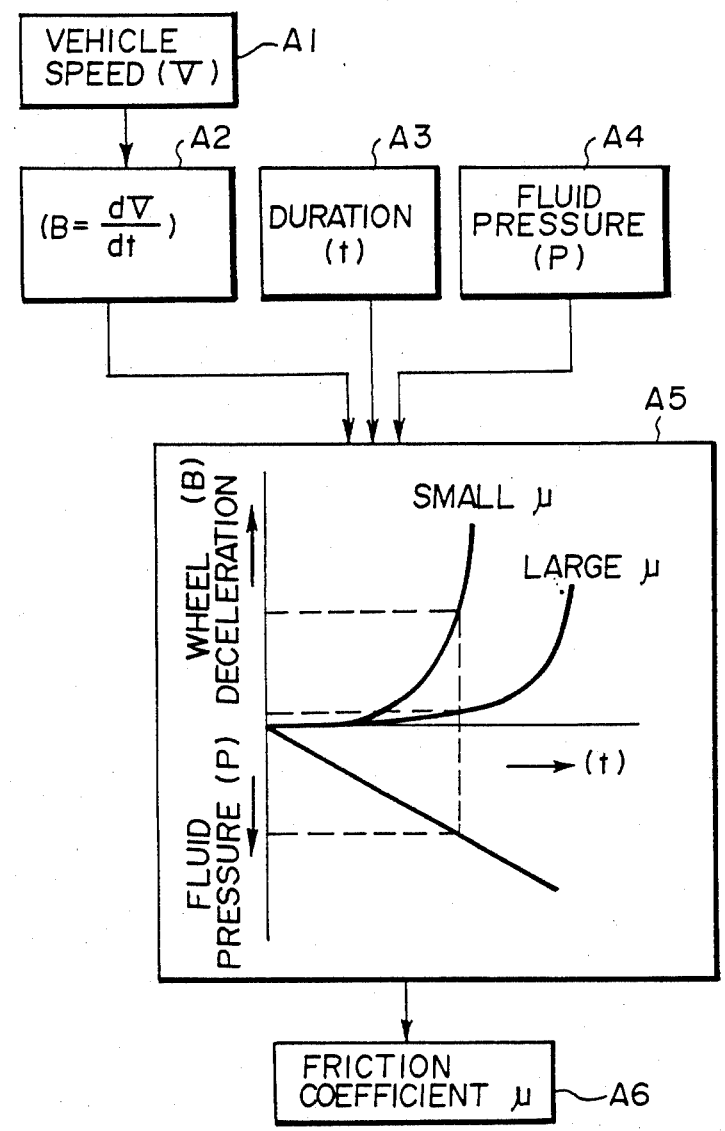
FIG. 18 is a flow chart for illustrating the manner of detecting the friction coefficient of the road surface.

In the fifth and sixth embodiments, the friction coefficient $\mu$ of the road surface can be detected in the following manner, for example. The friction coefficient $\mu$ of the road surface is obtained through the relation between the deceleration of the wheel speed and the brake fluid pressure. This will be described with reference to the flow chart shown in FIG. 18. First the wheel speed V is detected in step A1, and is differentiated with time to obtain the deceleration of the wheel speed B in step A2. The duration of application of the brakes t is detected in step A3 and the brake fluid pressure P is detected in step A4. Then in step A5, the relation between the change in the brake fluid pressure P and the deceleration of the wheel speed B is detected, and the friction coefficient $\mu$ of the road surface can be known from the relation in step A6. That is, that the deceleration of the wheel speed B for a given brake fluid pressure P is large means that the wheels are skidding by a large amount, i.e., the friction coefficient $\mu$ of the road surface is small.

Though in the embodiments described above, the driving connection between the front wheel driving system and the front wheel driving system is released by disconnecting the front drive shaft and the rear drive shaft, the driving connection can be released by releasing locking of the center differential 60 in the case of the full-time four-wheel drive as shown in FIG. 19. In FIG. 19, an actuator 100 moves the slider 87 on the spline 85 between the locking position shown by chained line x in which the left half of the slider 87 engages with the spline 85 and the other half of the slider 87 engages with the spline 86 to connect the ring gear 71 and the pinion carrier 75, and the retracted position in which the slider 87 is retracted away from the spline 86 to release the connection between the ring gear 71 and the pinion carrier 75 under the control of a controller 101. Into the controller 101 are input a differential lock control command and the releasing signal from the driving connection release modulator 13. When the releasing signal from the driving connection release modulator 13 is delivered to the controller 101, the controller 101 controls the actuator 100 to move the slider 87 to the retracted position irrespective of the differential lock control command.

We claim:

1. A brake control system for a vehicle provided with a four-wheel drive mechanism having a front wheel driving system and a rear wheel driving system arranged to be drivingly connected with each other and an antiskid brake system for controlling the braking effort upon application of the brakes to prevent locking of the wheels, comprising a deceleration detecting means for detecting deceleration over a predetermined level to such a degree that can lead to locking of the wheels, and a releasing means which, prior to actuation of said antiskid brake system, releases a driving connection between the front wheel driving system and the rear wheel driving system of the four-wheel drive mechanism when the deceleration detecting means detects deceleration over the predetermined level.

2. A brake control system as defined in claim 1 in which said brake application detecting means determines that the brakes are applied over the predetermined level when the brakes are continuously applied for a time longer than a predetermined time.

3. A brake control system as defined in claim 1 in which said deceleration detecting means determines that the brakes are applied over the predetermined level when the deceleration of the wheel speed exceeds a predetermined value to such a degree that can lead to locking of the wheels.

4. A brake control system as defined in claim 3 in which said predetermined value of the deceleration of the wheel speed is increased with increase in the vehicle speed.

5. A brake control system as defined in claim 3 in which said predetermined value is reduced as the friction coefficient of the road surface is lowered.

6. A brake control system as defined in claim 1 in which said brake application detecting means determines that the brakes are applied over the predetermined level when the difference between the deceleration of the wheel speed and the deceleration of the vehicle speed exceeds a predetermined value.

7. A brake control system as defined in claim 1 in which said releasing means opens the power transmission path of one of the front wheel driving system and the rear wheel driving system.

8. A brake control system as defined in claim 7 in which said releasing means comprises a hydraulic clutch mechanism.

9. A brake control system as defined in claim 7 in which said releasing means comprises a sleeve and a pair of splines.

10. A brake control system as defined in claim 1 in which said releasing means positively release locking of a center differential intervening between the front wheel driving system and the rear wheel driving system.

11. A brake control system as defined in claim 1 in which said antiskid brake system calculates the factor of skid of the wheels on the basis of the rotational speed of the front and rear wheels and controls the hydraulic pressure to the brakes based on the factor of skid of the corresponding wheels.

12. A brake control system as defined in claim 11 in which said antiskid brake system begins to operate after receipt of a signal representing that release of the driving connection of the front and rear wheel driving systems is completed.

* * * * *